US 6,697,471 B1

(12) United States Patent
Chan et al.

(10) Patent No.: US 6,697,471 B1
(45) Date of Patent: Feb. 24, 2004

(54) EXTENSION PHONE OFF-HOOK CHECK FOR TYPE 2 CALLER ID RECEPTION IN A TELEPHONE ADJUNCT DEVICE

(75) Inventors: Watson Yuet Lai Chan, Scarborough (CA); Sowjanya Reddy Pandipati, Singapore (SG); David Michael Brewster, Carmel, IN (US); John Justin Caffrey, Indianapolis, IN (US)

(73) Assignee: Thomson Licensing S.A., Boulogne (FR)

( * ) Notice: Subject to any disclaimer, the term of this patent is extended or adjusted under 35 U.S.C. 154(b) by 0 days.

(21) Appl. No.: 09/980,341

(22) PCT Filed: May 31, 1999

(86) PCT No.: PCT/SG99/00049

§ 371 (c)(1),
(2), (4) Date: Mar. 22, 2002

(87) PCT Pub. No.: WO00/74364

PCT Pub. Date: Dec. 7, 2000

(51) Int. Cl.[7] ................................................. H04M 1/56

(52) U.S. Cl. ............................ 379/142.08; 379/215.01

(58) Field of Search ...................... 379/142.01, 142.17, 379/142.08, 351, 215.01

(56) References Cited

U.S. PATENT DOCUMENTS

| 4,149,040 A |   | 4/1979  | Atkinson ............... 179/17 A |
|-------------|---|---------|----------------------------------|
| 4,640,987 A | * | 2/1987  | Tsukada et al. .......... 455/462 |
| 4,686,700 A |   | 8/1987  | Perry ..................... 379/183 |
| 5,086,462 A | * | 2/1992  | Oka ....................... 379/340 |
| 5,397,981 A | * | 3/1995  | Wiggers ................ 324/121 R |
| 5,649,002 A |   | 7/1997  | Brady et al. ............. 379/142 |
| 5,809,132 A | * | 9/1998  | Sakamoto .............. 379/377 |
| 5,818,923 A | * | 10/1998 | Consigilio et al. ..... 379/373.01 |

FOREIGN PATENT DOCUMENTS

| DE | 4109845 A1 | 10/1992 | ............ H04M/1/72 |
| WO | 99/04542   | 1/1999  | ............ H04M/1/00 |

* cited by examiner

Primary Examiner—Creighton Smith
(74) Attorney, Agent, or Firm—Joseph S. Tripoli; Harvey D. Fried; Joseph J. Kolodka

(57) ABSTRACT

A system and method for detecting a condition of an extension telephone is presented for processing caller ID information. A reference value of a telephone line connected to an apparatus is first determined. An auxiliary telephone connected to the apparatus is then disconnected. A second value of the telephone line is determined while the auxiliary telephone is disconnected. The reference value and the second value of the telephone line are compared to determine the condition, such as off-hook, of the extension telephone.

12 Claims, 2 Drawing Sheets

EXTENSION PHONE OFF-HOOK CHECK FOR TYPE 2 CALLER ID RECEPTION IN A TELEPHONE ADJUNCT DEVICE

This application claims the benefit under 35 U.S.C. §365 of International Application PCT/SG99/00049, filed May 31, 1999.

FIELD OF THE INVENTION

This invention generally relates to telephone status detection, and in particular to a system and method for detecting an off hook condition of an extension telephone for an adjunct device.

BACKGROUND OF THE INVENTION

In Call Waiting Caller ID (Type 2 Caller ID) reception, the Caller ID signal is sent to the telephone line while the telephone is off-hook. This signal may be too loud and noisy to the user on an extension phone, and the user's speech from the extension phone may corrupt the data. To avoid this situation, the CPE (Customer Premises Equipment) such as a Caller ID adjunct device, shall be able to check whether the extension phone is off-hook after a CAS tone (CPE Alerting Signal) is received. If an extension phone is off-hook, the CPE shall not send the ACK tone (Acknowledge Signal) and the Caller ID reception cycle can be terminated. This is recommended by industry standards such as those described in TIA/EIA-PN-4078 documents. In this specification, an "auxiliary" telephone is defined as a telephone connected directly to a CPE. An "extension" telephone is a telephone that is connected to the same telephone line that the CPE is connected to, but not directly to the CPE. This is illustrated, for example, in FIG. 1, where telephone 2 is an example of an extension telephone and telephone 3 is an example of an auxiliary phone.

SUMMARY OF THE INVENTION

The present inventors recognize the need for a CPE, such as a Caller ID adjunct, to have the following capabilities for implementing Type 2 Caller ID. An adjunct shall be able to detect an extension phone off-hook condition before replying to the CAS message with an ACK tone. An adjunct shall be able to distinguish extension off-hook (i.e., a phone in other room is in use) from the auxiliary phone off-hook (i.e., the phone attached to an adjunct is in use). An auxiliary phone line shall be muted and the keyboard of an auxiliary phone shall be disabled during the ACK tone and up to the end of FSK data (Caller ID data) reception, as stated in the TIA/EIA-PN-4078. In addition, during the whole Type 2 CID cycle, the telephone line shall be held off-hook all the time. Momentary on-hook cannot exceed 8 ms, as stated in TIA/EIA-PN-4078. Furthermore, if no extension telephone is off-hook, the ACK tone must be sent within a 100 ms time limit after the end of the CAS tone, as stated in TIA/EIA-PN-4078. Therefore the extension off-hook check must be completed and established within the 100 ms time constraint.

One possible approach to solving the above problems may be to perform an extension telephone off-hook check by temporarily-switching the CPE itself on-hook, as in TIA/EIA-PN-4078. The present inventors recognize the disadvantage of this method is that the on-hook period is limited to 8 ms as stated in TIA/EIA-PN-4078. For an adjunct CPE, if the attached auxiliary phone is switched on-hook, there will be transients generated on the phone line and on the CPE's line checking circuitry. Therefore, the 8 ms time is quite short to let the transient noise settle in order to make a valid extension off-hook check. Also, 8 ms is too short for a line monitoring circuitry to reach a reasonably steady state for an ADC (Analog to Digital Converter) input. Moreover, in case there is speech or electrical noise present on the phone line, the ADC accumulation shall be given as long as possible a period of sampling time in order to produce a more accurate averaged value.

Therefore, in accordance with the present invention, a system and method for detecting a condition of an extension telephone is presented for processing caller ID information. A reference value of a telephone line connected to an apparatus is first determined. An auxiliary telephone connected to the apparatus is then disconnected. A second value of the telephone line is determined while the auxiliary telephone is disconnected. The reference value and the second value of the telephone line are compared to determine the condition, such as off-hook, of the extension telephone.

DETAILED DESCRIPTION OF THE INVENTION

As is well known in the art, whenever a CPE adjunct or a phone goes off-hook, it draws current from the phone line (e.g., Tip and Ring line pair) and causes the line voltage to drop. The more extension telephones that go off-hook, the more the line voltage drops. Therefore, an extension off-hook check may be accomplished by monitoring the line voltage condition.

Figure 1:
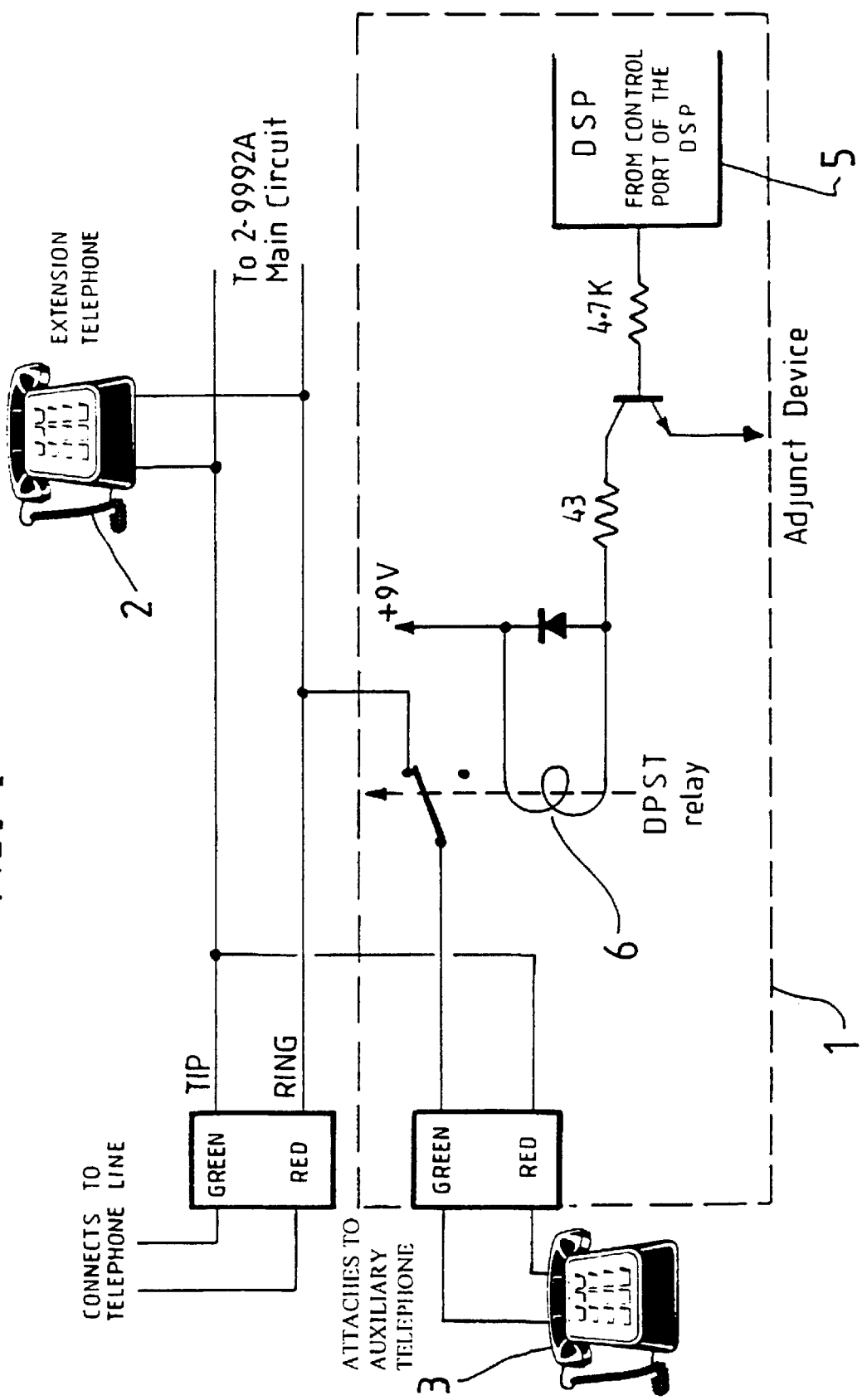
FIG. 1 is an example of a system in accordance with the principles of the present invention.
Figure 2:
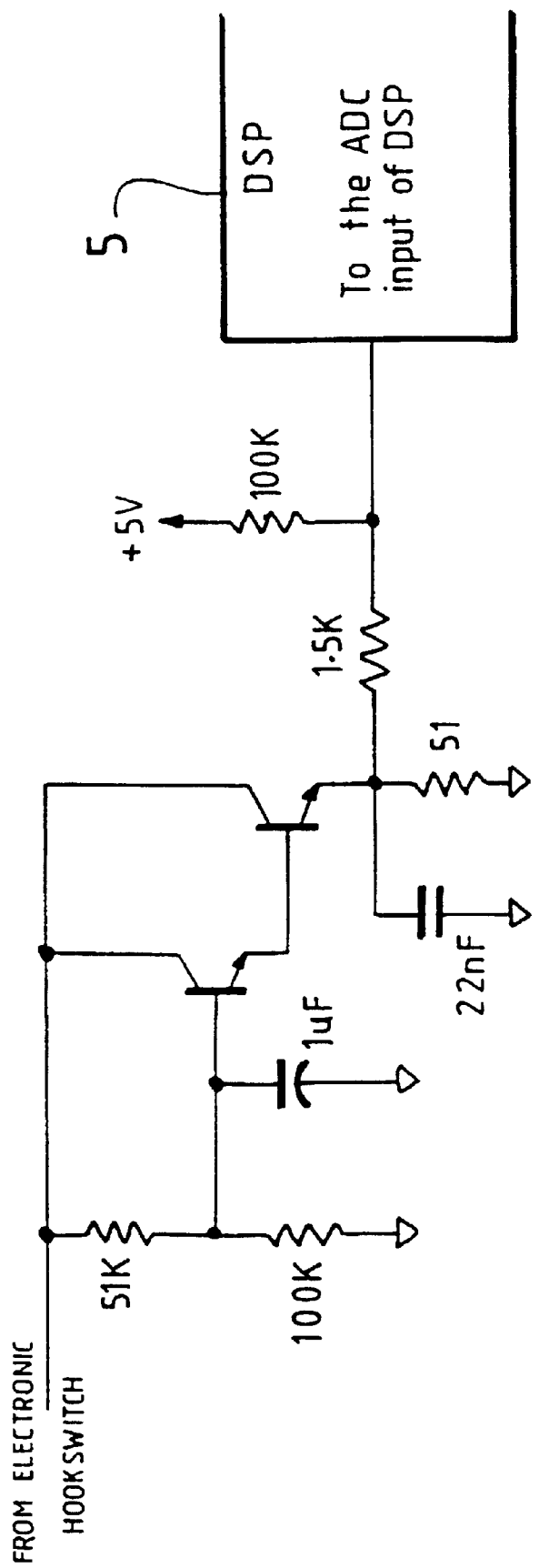
FIG. 2 is an example of a circuit to monitor the line voltage in accordance with the present invention.

In accordance with the present invention, detecting an extension telephone off-hook uses line monitoring, auto-disconnect, circuitry and an 8-bit ADC (Analog to Digital Converter) of a DSP (Digital Signal Processor), as shown in FIGS. 1 and 2 and described below.

In FIG. 2, an exemplary DSP 5, via its associated software, takes ADC samples, accumulates them, and compares it to a scaled reference value. The general idea of taking ADC samples of a telephone line and accumulating them is already well known in the art, and will not be discussed in detail below.

The ADC part of the DSP 5 shown in FIG. 2 reads samples at 900 Hz. It accumulates the samples for a 13.3 ms interval (12 samples) and stores it in a temporary variable. This temporary value represents the current phone line condition after receiving the CAS alert tone. The reference value is taken at a time when no extension phone is off-hook (an algorithm to be described in detail later), and it is sampled for a 50 ms interval (45 samples). The reference value is scaled down by 12:45 ratio. If the temporary value is greater than 80% of the scaled reference value, then the CPA adjunct determines that no extension is off-hook and sends the ACK tone. In pseudo code, the described operation looks like this:

if (temporary-value>(reference-value*(12/45)*(80/100)) sends-ACK-tone( );

In another aspect of the present invention, an exemplary CPE adjunct 1 employs a relay 6 to switch an auxiliary phone 3 away from the Tip and Ring of the telephone line, as shown in FIG. 1, in a timely fashion. By temporarily disconnecting the auxiliary phone 3 from the phone line, the present invention ensures that the subsequent checking of the line voltage represents solely the hook status of the extension phone, for example, telephone 2. In an exemplary embodiment as shown in FIG. 1, software for DSP 5 in device 1 controls a relay 6 in a timely manner right after CAS detection so that reasonable steady state is reached before the line voltage check for extension off-hook takes place.

The use and control of relay 6 also solves the problem of requiring the muting of an auxiliary telephone including its keyboard during the ACK tone period and up to the end of FSK Caller ID data reception, as described above. By disconnecting the auxiliary phone 3 from either the tip or the ring lead of the telephone line, the auxiliary phone is completely muted and any key dialed or activated from the auxiliary phone will not be sent to the phone line.

The system shown in FIG. 1 also keeps the phone line of the auxiliary device 1 off-hook all the time during the Type 2 CID cycle as discussed above, and does the extension off-hook checking while the adjunct 1 itself is off-hook. As discussed above, if a temporary value of the telephone line is greater than 80% of a scaled reference value, the DSP determines that the extension is not off-hook. Field-testing has indicated that the 80% value is a preferred value. This is an off-hook level detection method. In order for an exemplary adjunct 1 in accordance to the present invention to have a reference value of only itself being off-hook, it takes the reference when it answers a call and when no off-hook transition has been detected. An off-hook transition (auto-disconnect) detection method is well known in the art and will not be described in detail.

Alternatively, the reference value may be taken in a power-up initialization process of the adjunct by switching the exemplary adjunct itself off-hook for 1.2 seconds and looking for a dial tone. If the adjunct detects the dial tone, it assumes that no extension is off-hook and therefore the reference value is validated. The dial-tone detection may be implemented, for example, as a notch filter in DSP software, as is well known in the art. In yet another alternative embodiment which may require less ROM programming space, a reference value is simply initialized with a small value until it is updated when an adjunct 1 answers a call. Although this may present a failure if the adjunct has not answered a call since power up when a Caller ID message is received, it requires less ROM programming space.

The present invention also solves the problem that the ACK tone must be sent within 100 ms after the end of the CAS tone, as described above. The 100 ms constraint leaves little time for validation of the CAS tone and checking of extension off-hook condition. The CAS detection software may take up 30 ms after the end of the CAS tone before it can set the CAS DETECT flag. Upon seeing the CAS DETECT flag, the exemplary adjunct 1 goes off-hook, and switches away the auxiliary phone relay as described above. This switching causes transients on the phone line and in the line monitoring circuitry. Also it takes some time for line monitoring circuitry to reach a reasonable steady state for the ADC input. Therefore, the exemplary software waits for another 36 ms. To facilitate testing of the present invention on a test instrument such as an Advent Instrument CID-1500 tester, an 18 ms slack time is allotted for the test instrument to detect the ACK tone. By calculation, 100 ms−30 ms−36 ms 18 ms=16 ms. Therefore, in order to send the ACK tone within 100 ms+/−8 ms after the end of CAS tone, the temporary value has to be taken and accumulated for no longer than 16 ms. To give it a 2 ms to 3 ms safety margin, the temporary value is accumulated for only 13.3 ms (12 samples) in an preferred embodiment. For this reason, the 50 ms (45 samples) reference value needs to be scaled down by a ratio of 12:45 for a valid off-hook level comparison.

Therefore, the present invention is able to detect the conditions of other extension telephone off-hooks before replying a CAS message with an ACK message. The present invention is also able to distinguish extension telephone off-hook from an auxiliary telephone off-hook condition. The present invention is also able to mute an auxiliary telephone during an appropriate time frame, and detect accurately an extension off-hook condition by placing the adjunct itself off-hook.

It is to be understood that the embodiments and variations shown and described herein are for illustrations only and that various modifications may be implemented by those skilled in the art without departing from the scope and spirit of the invention.

What is claimed is:

1. An apparatus for detecting a condition of an extension telephone, comprising:

means for detecting a reference value of a telephone line connected to the apparatus;

means for disconnecting an auxiliary telephone connected to the apparatus; and means for detecting a second value of the telephone line while the auxiliary telephone is disconnected by the disconnecting means.

2. The apparatus of claim 1 further comprising means for comparing the reference value and the second value of the telephone line to determine the condition of the extension telephone.

3. The apparatus of claim 2 wherein the condition is an off-hook condition.

4. The apparatus of claim 1 wherein the disconnecting means is a rely.

5. The apparatus of claim 1 wherein the reference value is determined during a power on process of the apparatus.

6. The apparatus of claim 1 wherein the reference value is determined when an apparatus anwsers a telehone call.

7. The apparatus of claim 1 wherein the auxiliary telephone is disconneted after a CAS signal is received by the apparatus.

8. The apparatus of claim 7 wherein the apparatus sends a acknowledgement to the CAS signal, if the second value is different than the reference value.

9. A device comprising:

a signal processor for detecting a reference value of a telephone line connected to the device;

a circuit for disconnecting a telephone connected to the device; and the signal processor determining a second value of the telephone line while the telephone is disconnected by the circuit.

10. The device of claim 9 wherein the signal processor compares the reference value and the second value of the telephone line to determine the off-hook status of the telephone.

11. A method for processing caller identity information, comprising the steps of:

detecting a reference value of a telephone line connected to an apparatus;

disconnecting an auxiliary telephone connected to the apparatus; and detecting a second value of the telephone line while the auxiliary telephone is disconnected by the disconnecting means.

12. The method of claim 9 further comprising the step of comparing the reference value and the second value of the telephone line to determine the condition of the telephone.

* * * * *